July 7, 1964 F. E. REIMERS ETAL 3,140,201
DRY PULVERULENT SUGAR PRODUCTS AND PROCESS FOR PRODUCING SAME
Filed Jan. 9, 1962
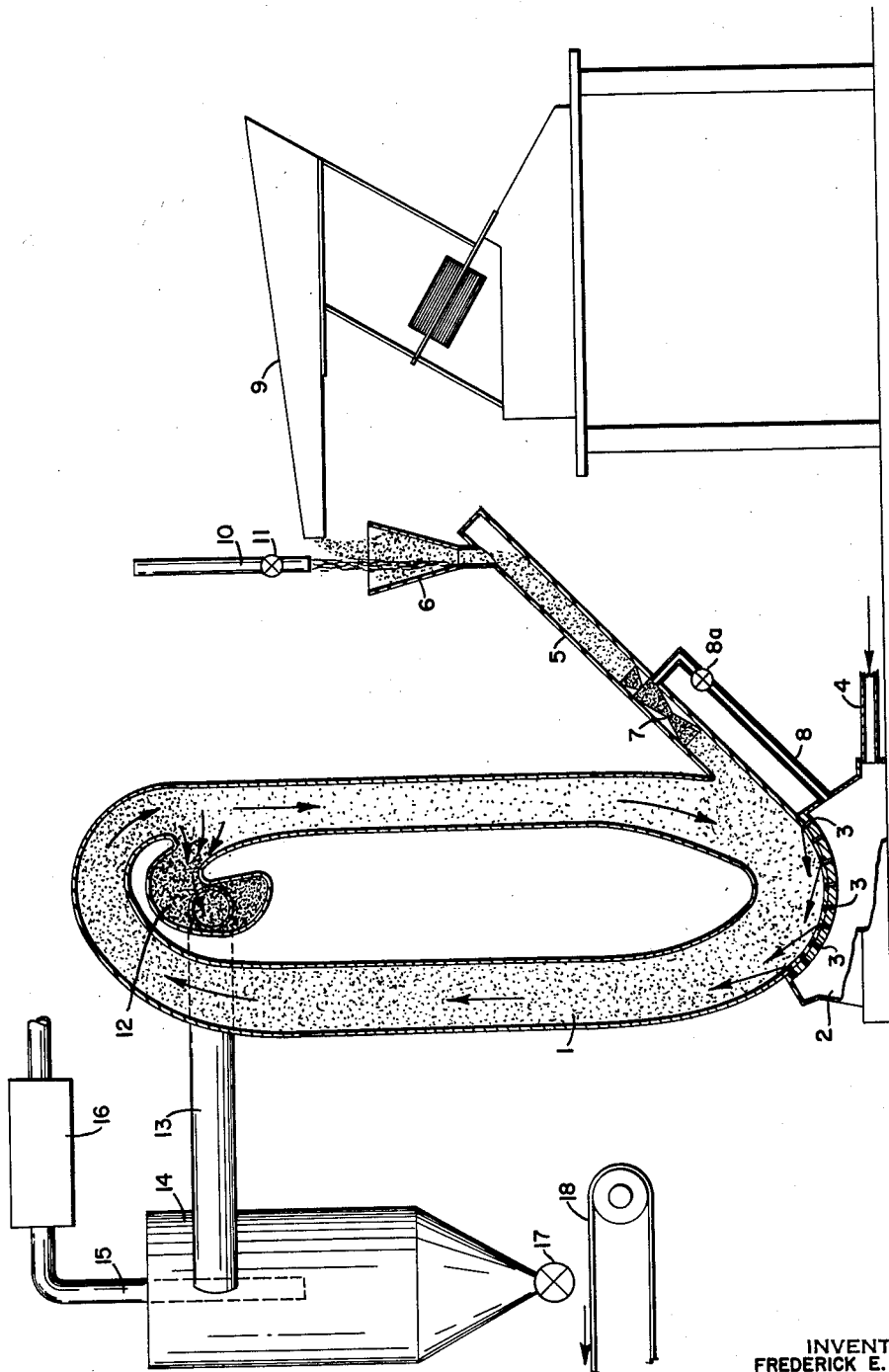
INVENTORS
FREDERICK E. REIMERS
MARVIN D. MILLER
FREEMAN BUSH
BY
ATTORNEYS

3,140,201
DRY PULVERULENT SUGAR PRODUCTS AND PROCESS FOR PRODUCING SAME

Frederick E. Reimers, Westfield, N.J., and Marvin D. Miller, Oceanside, and Freeman Bush, Hollis, N.Y., assignors to American Sugar Company, New York, N.Y., a corporation of New Jersey
Filed Jan. 9, 1962, Ser. No. 165,121
4 Claims. (Cl. 127—63)

This invention relates to sugar compositions containing substantial and effective proportions of invert or other reducing sugars. Such sugar mixtures containing invert or other reducing sugars are highly useful in the preparation of sugar fabrications where a grainy texture, such as may result from the use of sucrose alone, is objectionable and where the retention of moisture is desirable, for instance in cake icings, fondants, fudge and the like.

Our present invention provides new and improved compositions of this general type and also a highly efficient, effective and economical method by which they can be readily and continuously produced.

Our improved sugar products are in a substantially dry, finely-divided or pulverulent form of a particle size adapting them for use in cake icings, fondants, etc., and advantageously an average particle size of about 5-8 microns, or less, and with the maximum particle size of not more than 40 microns, and containing up to about 1 part, or somewhat more, by weight, of invert or other reducing sugars for each 4 parts of sucrose, yet the products are nonsticky, are relatively nonhygroscopic and have remarkable noncaking properties. The ratio of invert, or other reducing sugars is from about 5% to 25% of the product, and advantageously between about 8% and 15% of the product.

Previous attempts to convert invert sugars or invert sugar syrups, or sucrose mixtures containing substantial proportions thereof, to a dry, powdered form have heretofore met with major problems, primarily due to the inherent properties of the invert, including its hygroscopic nature. It has heretofore been proposed to dry such mixtures and subject the dried material to a separate grinding operation. However, such procedure has resulted in a low yield of the pulverulent mixture due to dusting and the formation of lumps containing substantial proportions of undried invert. It has also been proposed to mix the invert with powdered sugar under carefully controlled conditions so as to envelop the invert with the fine sucrose particles and thus cause the stickiness of the invert to be no longer manifest. This procedure has, likewise, been subject to difficulties.

We have discovered that improved mixtures of sucrose and effective proportions of invert, ranging up to about 20% or somewhat more by weight, composed of finely-divided particles, of substantially uniform size, and which are free-flowing, relatively non-hygroscopic and noncaking, may be readily, continuously and economically produced in high yields by subjecting a mixture of granular sucrose and a predetermined proportion of invert, to a simultaneous drying and grinding action of a conventional fluid energy mill in which the particles of sugar, wet with the invert, while suspended in air or other inert dry gas, are subjected to attrition by violent impact between the solid particles. For this purpose we have used most effectively a fluid energy mill of the type marketed by the Fluid Energy and Processing Equipment Company under its proprietary name Jet-O-Mizer, and which is the subject of Patent No. 2,590,220.

In carrying out the process of our invention, a prepared mixture of granulated sucrose and invert, in the desired proportions, may be continuously charged to apparatus of the type just identified, or the granular sucrose and invert syrup, in constant predetermined, measured proportions, may be separately charged continuously to the feed hopper of the mill advantageously at an elevated temperature.

The energizing gas is preferably air and should preferably be charged to the mill at an ambient temperature, say about 80° F.

The process of our invention will be further described with reference to the accompanying drawing which represents diagrammatically a fluid energy mill of the above-noted Jet-O-Mizer type especially adapted to the carrying out of the process. In the drawing, the size of the particle is intended to be illustrative, rather than actual size.

This fluid energy mill consists essentially of a grinding chamber 1 in the form of an upright, elongated torus (doughnut shape), the cross-section of which is in the form of an inverted trapezoid, as more fully described in the above-noted patent. An energizing gas chamber 2 is positioned beneath the lower end of the grinding chamber and is connected therewith through a plurality of fine orifices or nozzles indicated at 3. A gas under pressure, air, for instance, at ambient temperature, is supplied to chamber 2 through inlet 4 and is jetted at sonic or supersonic velocity into the lower portion of chamber 1 as a plurality of jet streams directed tangentially to the chamber wall, substantially as shown.

The mill is provided with a feed conduit represented at 5 which leads into the lower end of the grinding chamber in a substantially tangential direction. At the outer end of conduit 5, there is provided a feed hopper represented at 6 and intermediate the ends of inlet conduit 5, there is provided an injector represented at 7 to which gas under pressure is delivered from chamber 2 through the conduit 8, having control valve 8a therein.

Suitable feed means, for instance a vibratory feeder, indicated at 9, is provided for feeding the granulated sucrose at a predetermined control rate into the feed hopper 6, and feed line 10, in which there is positioned a control valve 11, is provided for charging the invert syrup to the feed hopper at a predetermined control rate.

The arrangement shown on the drawing is adapted to that aspect of the invention according to which separate streams of the granular sucrose and the invert syrup are simultaneously charged to the hopper. But as previously described the granulated sucrose and the invert syrup may be premixed in the desired proportions and the mixture charged to the feed hopper 6.

In passing from the gas chamber 2 into the grinding chamber 1, the high pressure air is converted to tangentially directed sonic or supersonic gas streams causing suspension of the charge in the gas streams and violent impact between the suspended particles, as previously described, and causing the suspension to circulate through the grinding chamber in a clockwise direction.

At the upper end of the grinding chamber, there is provided a classifying section indicated at 12 from which the energizing gas is withdrawn through outlet conduit 13, carrying with it the pulverized dry particles in suspension. From conduit 13, the suspension is passed to a suitable separator or separators, for instance a cyclone separator, as indicated at 14, whereby the solid particles are separated from the gases and are retained in the separator, the gases passing off through outlet 15 and dust collector 16 to the atmosphere. At the lower end of the separator, there is provided a valve, for instance a star valve, as indicated at 17, to permit withdrawal of the solid particles while inhibiting escape of the gases from the lower portion of the separator. The collected solids are withdrawn from the separator as desired onto a conveyor, of any suitable type, indicated at 18.

By adjustment of the energizing gas throughput, relative to the dimensions of the apparatus, the velocity of the gases passing into the classifying section 12 is controlled so as to carry from the circulating, high velocity gas stream only those solid particles which have been dried and reduced to a predetermined particle size. Such withdrawal of solid particles is, of course, opposed by centrifugal forces tending to throw the particles toward the outer wall of the mill, away from the entrance to the classifying section, so that the heavier, insufficiently dried and larger particles are recycled through the grinding chamber for further attrition and drying.

The sucrose and invert syrup are advantageously charged to the mill at an elevated temperature sufficiently high to increase fluidity of the syrup so as to prevent clogging of the charge in the inlet conduit or the feed hopper. Where the granular sucrose and syrup are charged to the hopper prior to mixing, they may be separately preheated.

The temperature to which the sucrose is preheated is not critical so long as it does not unduly cool the invert syrup when mixed therewith. We have satisfactorily charged the sucrose to the mill at temperatures ranging from 75° to 175° F.

The preheat temperature of the invert syrup is of greater importance. Further, the preheating of the invert syrup serves a dual function. Not only does it minimize the danger of clogging the feed conduit or hopper, but it serves to reduce the water content of the syrup.

It will be recognized, of course, that the amount of residual water in the syrup will be primarily dependent upon the temperature to which it has been heated. For satisfactory use in accordance with our present invention, the syrup is advantageously heated to a temperature within the range from about 240° to about 280° F. with concurrent evaporation of water therefrom. It is not essential, however, that the syrup be charged to the grinding operation at such high temperatures. Satisfactory operation has been obtained where the charging temperature of the syrup was as low as about 200° F.

We have found that where the water content of the invert syrup is excessively high, there is a tendency to produce a wet, gummy product containing unground sucrose crystals. The permissible water content of the syrup charged in our process will depend, of course, upon the relative proportion of sucrose and syrup used. It is, therefore, impractical to specify a numerical limit for the proportion of water in the syrup charged. We have, however, generally found that the temperature to which the syrup has been heated is a satisfactory criterion of water content.

We have further found that the invert content of the syrup used, while subject to considerable variation, should not be less than about 40%, by weight. By operating within these prescribed limits, we can produce by our process a dry, pulverulent, homogeneous sugar composition containing effective proportions of invert to avoid graining in its ultimate use, e.g., at least about 5% and advantageously about 8% and up to about 20% or 25% by weight of invert sugars, yet is substantially noncaking and nonhygroscopic, the maximum particle size not exceeding about 40 microns and the mean particle size advantageously ranging from about 5 to about 8 microns, or less, and of a particle size suitable for use in fondants, etc.

The invention and the utility thereof will be further illustrated by the following specific examples, but it will be understood that the invention is not restricted thereto. The parts are by weight.

*Example I*

In this operation, medium granulated sugar was heated to a temperature of 200° F. and an invert syrup, analyzing 69.4% invert, 7.9% sucrose and 22.7% water, was heated to 250° F. During this heating of the syrup, there was a substantial loss of water so that following the heating, the composition of the syrup was 78.2% invert, 9.5% sucrose and 12.3% water. 7.5 parts of the granular sugar, at an average temperature of 160° F., and 1 part of the syrup, at an average temperature of 190-200° F., were separately and simultaneously charged to the mill at a combined average feed rate (solid basis) of approximately 53 pounds per hour.

Air was charged to the grinding nozzles at a temperature of 80° F. and at a gauge pressure of 73 pounds per square inch. The air charged to the injector nozzle was, also at about 80° F. and its gauge pressure at the nozzle was 57 pounds per square inch.

There resulted from this operation a finely-divided, dry, pulverulent product shown by analysis to contain 8.44% invert and 0.89% water.

*Example II*

Medium granulated sugar was heated to a temperature of 175° F. An invert syrup of 75.4° Brix and composed of 67.0% invert, 8.4% sucrose and 24.6% water was heated to 250° F. with substantial loss of water. The syrup following heating was 86.3° Brix, the composition being 76.7% invert, 9.6% sucrose and 13.7% water.

The preheated granulated sugar was fed to the hopper of the previously-described mill by means of a vibrating feeder and simultaneously the hot invert syrup was added at a constant rate into the feed hopper, 4.2 parts of the sugar at a temperature of about 150° F. and 1 part of invert syrup at a temperature of 200° F. being thus added, the combined feed rates on a solid basis being about 23 pounds per hour.

Air was charged to the grinding nozzles at a temperature of 75° F. and at a gauge pressure of 75 pounds per square inch. Air charged into the injection nozzle was at a similar temperature and at a gauge pressure of 55 pounds per square inch.

There resulted from this operation a dry, pulverulent product shown by analysis to contain 15.6% invert and 1.50% water.

*Example III*

3.6 parts of granulated sugar was charged to a Hobart mixer and while agitating the sugar therein, 1 part of invert syrup, containing 32% sucrose, 43% invert and 25% water were slowly added to the mixer. The agitation was continued for 10 to 15 minutes, at the end of which time the materials had been uniformly mixed.

The resultant mixture was heated to a temperature of 230° F. Though the mixture was found to have dried somewhat, it was still quite tacky. This material was continuously charged into the hopper of the mill previously described at a rate of 25-30 pounds per hour.

Air at a temperature of 82° F. and at a gauge pressure of 72 pounds per square inch was supplied to the grinding nozzles. Air at the same temperature was supplied to the injection nozzle at a gauge pressure of 57 pounds per square inch. There resulted from this operation a dry, extremely finely-divided product shown by analysis to contain 13.1% invert and 0.96% water.

While the invention has been more particularly described in connection with incorporating invert syrup with sucrose to produce the new products, it will be understood that other syrups containing reducing sugars, such as corn syrup or liquid dextrose, can be incorporated to produce products for use in fondants, cake icings, fudge, etc.

We claim:

1. Process for producing a dry, non-hygroscopic, non-caking, pulverulent, homogeneous sugar composition consisting predominantly of sucrose particles and containing from about 5% to about 25% by weight of invert or other reducing sugars, which comprises charging an admixture of granular sucrose and a syrup of invert or other reducing sugars at an elevated temperature to a fluid energy mill, the proportion of said sucrose and said syrup in said admixture charged to said fluid energy mill being such that the resulting sugar composition product contains from about 5% to about 25% by weight invert or other reducing sugars, and therein subjecting the admixture while suspended in an air stream at ambient temperature to attrition by violent impact between the particles of the granular sucrose of said admixture thereby simultaneously pulverizing and drying the admixture.

2. The process of claim 1 in which the syrup is preliminarily heated to a temperature in the range 240–280° F. with concurrent evaporation of water therefrom.

3. The process of claim 1 in which the invert content of the invert syrup is not less than about 40% by weight.

4. A method of producing a dry, non-hygroscopic, non-caking, homogeneous, uniform particle size sugar product, said sugar product having an average particle size in the range 5–8 microns with a maximum particle size not more than about 40 microns, which comprises forming an admixture consisting essentially of granular sucrose and a syrup containing dissolved therein invert or other reducing sugars, said admixture being formed at an elevated temperature by preheating said sucrose to a temperature in the range 75–175° F. and by preheating said syrup to a temperature in the range from about 240° F. to about 280° F. with concurrent evaporation of water therefrom, the proportions of said granular sucrose and said syrup in said admixture being such that the resulting sugar product contains from about 5% to about 25% by weight invert or other reducing sugars, charging said admixture at an elevated temperature to a fluid energy mill and therein subjecting the admixture while suspended in an air stream at ambient temperature to attrition by violent impact between the particles of the granular sucrose of said admixture to simultaneously pulverize and dry said admixture and withdrawing the aforesaid sugar product from said fluid energy mill as product.

References Cited in the file of this patent
UNITED STATES PATENTS

| | | |
|---|---|---|
| 2,590,220 | Stephanoff | Mar. 25, 1952 |
| 2,668,128 | Oxnard et al. | Feb. 2, 1954 |
| 2,910,386 | Lachmann et al. | Oct. 27, 1959 |
| 2,910,387 | Lachmann et al. | Oct. 27, 1959 |
| 2,910,389 | Lachmann | Oct. 27, 1959 |